United States Patent [19]

Sasnett

[11] 4,156,208

[45] May 22, 1979

[54] MECHANISM FOR INITIATING DISCHARGE IN A HIGH POWER GAS TRANSPORT LASER

[75] Inventor: Michael W. Sasnett, Los Altos, Calif.

[73] Assignee: GTE Sylvania Incorporated, Stamford, Conn.

[21] Appl. No.: 793,520

[22] Filed: May 4, 1977

[51] Int. Cl.² ............................................. H01S 3/097
[52] U.S. Cl. ........................ 331/94.5 PE; 331/94.5 G
[58] Field of Search ................ 313/197; 315/203, 335, 315/336; 328/228, 251; 331/94.5 PE, 94.5 G

[56] References Cited

U.S. PATENT DOCUMENTS

| 2,593,486 | 4/1952 | Reeves | 328/251 |
|---|---|---|---|
| 3,772,610 | 11/1973 | Foster et al. | 331/94.5 G |
| 3,781,712 | 12/1973 | Judd | 330/4.3 |
| 3,886,479 | 5/1975 | Pearson | 313/197 |
| 4,077,018 | 2/1978 | Fahlen et al. | 331/94.5 PE |

Primary Examiner—William L. Sikes
Attorney, Agent, or Firm—John F. Lawler

[57] ABSTRACT

A starter element for a high power gas transport laser having cathode and anode electrodes connected across a constant current DC power supply comprises a wire-like conductor connected in parallel with the cathode to the negative terminal of the power supply and extending between the cathode and anode parallel to the gas flow transversely of and spaced closely to the middle of the cathode. The free end of the starter element extends approximately 1 cm. beyond the downstream edge of the cathode and, when the output potential of the DC power supply is applied, causes a breakdown of the gas due to the high field strength at the starter end, producing an electrical discharge between that end and the central portion of the cathode. This induces the main electric discharge between the cathode and anode. In a laser having two or more sets of cathode-anode electrodes, a starter element for each cathode is connected to the power supply in parallel with the other starter elements through a series-connected resistor and a diode which electrically isolate the starter elements from each other.

9 Claims, 3 Drawing Figures

U.S. Patent  May 22, 1979  4,156,208
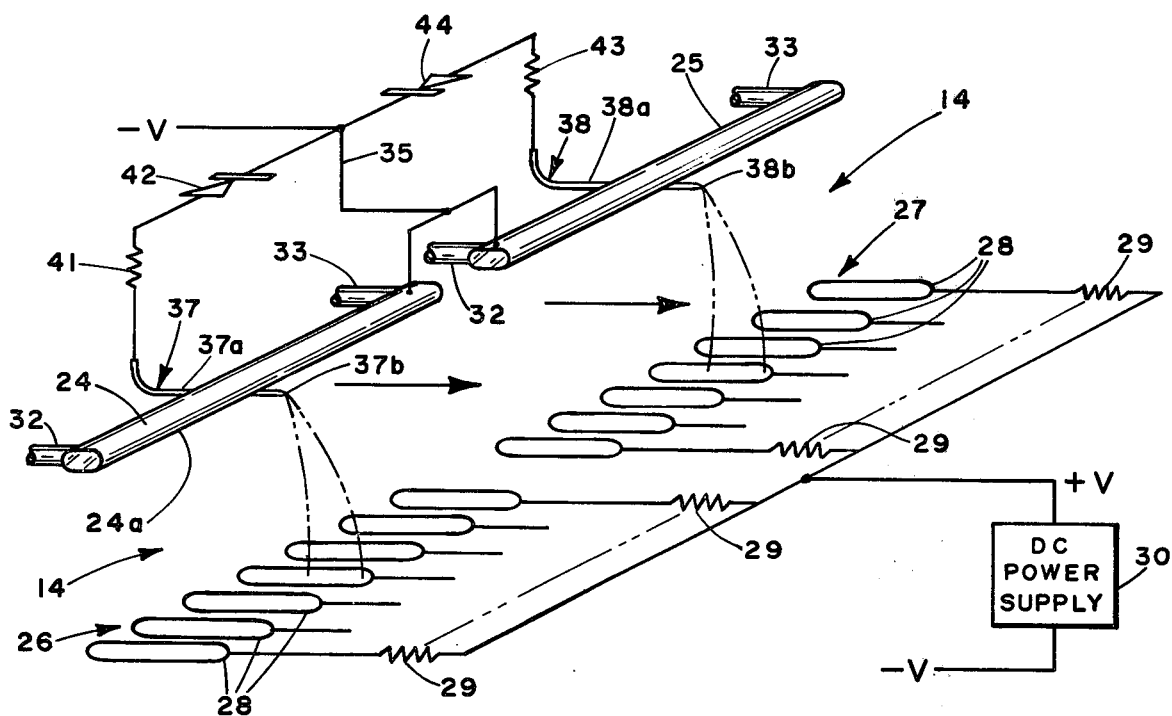
FIG. 2
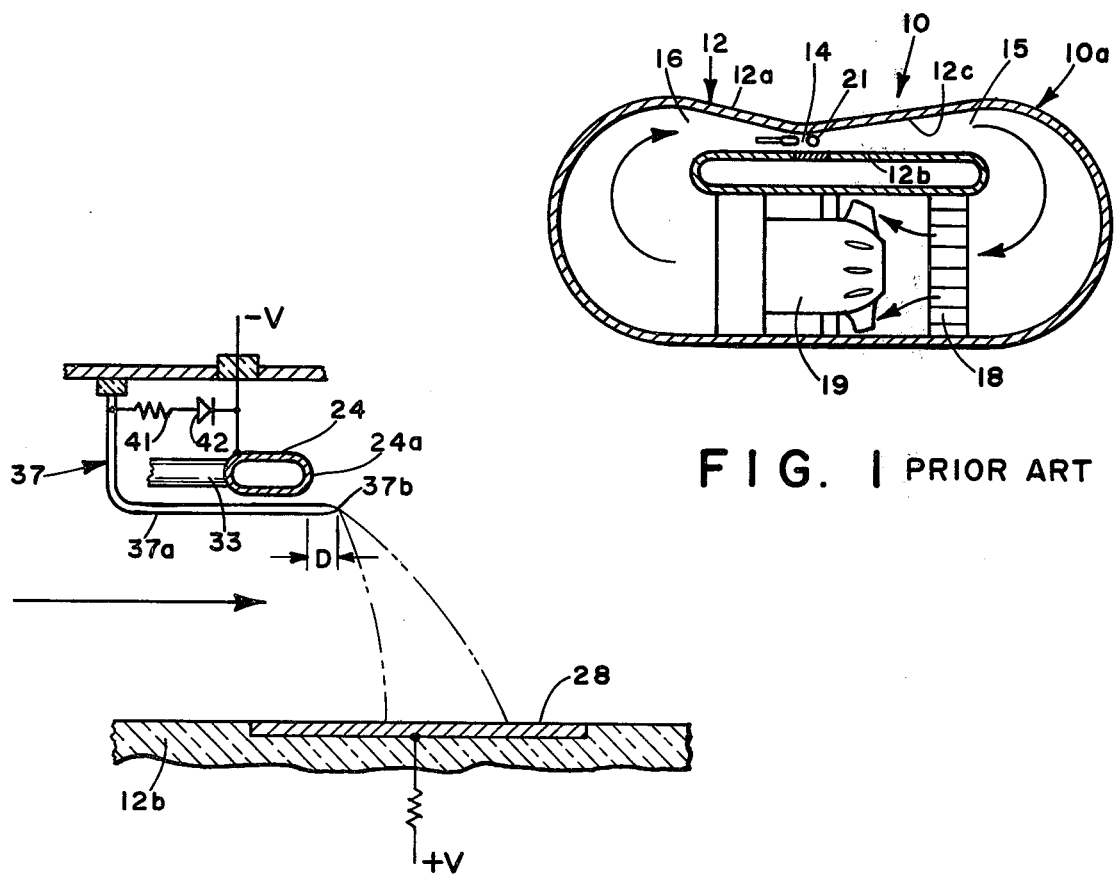
FIG. 1 PRIOR ART
FIG. 3

4,156,208

MECHANISM FOR INITIATING DISCHARGE IN A HIGH POWER GAS TRANSPORT LASER

BACKGROUND OF THE INVENTION

This invention relates to high power gas transport lasers and more particularly to an improved starting element for such a laser.

In order to initiate electrical discharge between electrodes of a gas transport laser as described in U.S. Pat. No. 3,772,610, a separate electrode is mounted adjacent to the cathode and preionizes the gap between the cathode and anode of the laser. Such a starter element has performed satisfactorily for a laser having a single set or pair of electrodes, i.e., one cathode and one anode, but is not effective in a laser having two or more sets of electrodes connected in parallel across the high voltage DC power supply. Such a multi-electrode laser is described in copending application Ser. No. 773,826 of R. J. Pressley et al, now Pat. No. 4,114,114, assigned to the assignee of this invention. As the voltage is raised to initiate a two-cathode discharge, one cathode discharge invariably starts first due to unavoidable impedance differences between the two sets of electrodes, and because of the resultant voltage drop when the main discharge occurs, the second cathode discharge is unable to start.

In U.S. Pat. No. 4,114,114, preionization of the gaps between the two sets of laser electrodes is achieved by applying a pulse or series of pulses simultaneously to the anodes from a common power source through a transformer. This technique is effective to start the main electrical discharges between both sets of electrodes and thus reliably to start the laser. Implementation of this technique, however, requires that high voltage insulation be added to the anode pads to which the starting pulses are applied to prevent inter-pad arcing. Such anode design changes together with the need for transformer equipment have added to the complexity and cost of the laser.

This invention is directed to an improved solution of the laser starting problem.

OBJECTS AND SUMMARY OF THE INVENTION

A general object of this invention is the provision of a relatively simple starter element for a gas transport laser which effectively preionizes the gap between the laser electrodes for starting the main electrical discharge between those electrodes.

A further object is the provision of means for effectively starting the main electrical discharges in a gas transport laser having two or more sets of electrodes.

These and other objects of the invention are achieved with a wire-like starter element supported proximate to and transversely of the cathode of the laser so that the element has one end near the cathode, and electrically connecting the element to the negative terminal of the power supply in parallel with the cathode. The end of the energized element perturbs the electric field near the cathode and produces an electrical discharge between the end of the element and the anode thereby inducing the main electrical discharge between the cathode and anode. The starting technique is especially useful with lasers having two or more sets of electrodes connected in parallel to the power supply since the starter elements are readily electrically isolated from each other so as to operate independently.

BRIEF DESCRIPTION OF DRAWINGS

FIG. 1 is a schematic vertical section of one of two sections of a closed cycle gas transport laser embodying the invention;

FIG. 2 is an enlarged schematic perspective view of the electrode circuit structure of the two-section laser of FIG. 1 showing the two sets of electrodes (cathodes and anodes) and a starter element embodying this invention for each set; and FIG. 3 is an enlarged transverse sectional view of the laser electrode structure showing the starter element embodying this invention.

DESCRIPTION OF PREFERRED EMBODIMENT

Referring now to the drawings, FIG. 1 is a schematic representation of a two-section closed cycle high power gas transport laser system 10, only one of the sections, namely, section 10a being shown in the drawing. The other section is substantially identical in construction to section 10a except that the sections are mirror images of each other. Accordingly, it will be sufficient for an understanding of this invention that only one of the sections is described, like parts being indicated by the primes of like reference characters on the drawings.

Section 10a comprises duct or channel 12 with a top wall 12a, a bottom wall 12b and side walls, one of which is indicated at 12c, generally configured to define a closed fluid path through which a gas mixture is recirculated in the direction of the arrows. The channel has a throat section 14 defining the lasing or discharge zone of the system, a diffuser portion 15 on the downstream side of this zone in which the gas velocity is reduced and a nozzle portion 16 upstream from the discharge zone in which the gas velocity is increased prior to entering the throat. The remainder of section 10a includes a heat exchanger 18 which removes heat from the gas flowing through it and a blower 19 which circulates the gas through the channel.

The gas mixture used in this system preferably consists of helium, nitrogen and carbon dioxide in well known proportions that support lasing action in discharge zone 14 to produce coherent light at 10.6 microns.

The two sections of laser system 10 are secured together in side-by-side relation with their inner side walls adjacent to each other and provided with openings that are aligned with each other and with discharge zones of the two sections providing path for the laser beam. Mirrors mounted on the outer side walls of the two sections in alighment with the discharge zones define the laser cavity; one of the mirrors is indicated at 21.

Referring now to FIGS. 2 and 3, the electrodes for the two sections of the laser comprise elongated tubular cathodes 24 and 25 spaced from segmented anodes 26 and 27, respectively, defining the discharge zones 14 therebetween. These electrodes extend transversely of the direction of flow of the $CO_2$ gas mixture indicated by the arrows in the drawings. While the laser is operating, an electrical discharge occurs between each cathode and the associated anode through the gas mixture to produce the laser beam within the optical cavity defined by the mirrors described above. The power of the ouput beam attained with this apparatus is in the order of 5 kilowatts or more.

Anodes 26 and 27 are substantially identical and each comprises a plurality of conductive pads 28 mounted on bottom wall 12b and connected through ballast resistors 29 to the positive terminal of a high voltage constant current DC power supply 30. Cathodes 24 and 25 are substantially identical and each comprises an elongated copper tube connected at opposite ends to conduits 32 and 33 which support the cathode on channel 12 and also direct cooling fluid through it from an external source. By way of example, the cathodes may have an elongated or "racetrack" configured cross-section. Cathodes 24 and 25 are connected in parallel to the negative terminal $-V$ of power supply 30 by line 35 as shown.

The foregoing laser construction is in the prior art and does not per se constitute this invention.

In accordance with this invention, in order to initiate the main electrical discharge between both sets of anodes and cathodes, wire-like starter elements 37 and 38 are supported from top wall 12a of the channel and have straight portions 37a, 38a which extend under cathodes 24 and 25, respectively, in a direction parallel to the gas flow. Elements 37 and 38 are electrical conductors such as nickel wire having a diameter of about 0.05 inches, and preferably have pointed ends 37b and 38b, respectively. Each starter element is spaced closely to the associated cathode, preferably the underside thereof, and extends beyond the downstream edge 24a and 25a of the cathodes by a relatively short distance D. For example, for a cathode-anode separation of 4.8 cm., the starter element is spaced 0.3 cm. from the underside of the associated cathode and extends 0.8 cm. beyond the downstream edge thereof.

Starter elements 37 and 38 are electrically connected in parallel to the negative terminal $-V$ of the power supply 30, element 38 via series-connected resistor 41 and diode 42, and element 38 via similarly connected resistor 43 and diode 44. Resistors 41 and 43, which may vary in value from 2 K ohms to 5 K ohms, in conjunction with diodes 42 and 44, serve to isolate each starter element from the other so that the voltage drop which accompanies the main discharge between one cathode-anode set does not affect the operation of the starter electrode associated with the other cathode-anode set. If the value of resistors 41,43 is too low, no starter discharge on the side of the laser that is the more difficult to start, i.e., that has the greater cathode to anode impedance, will occur. If the resistance is too high, both starter element discharges begin but as soon as one main discharge begins, the other starter discharge is extinguished.

The use of diodes in the starter circuit provides high resistance at low currents which is effective in initiating both starter element discharges. As the starter current increases, diode resistance becomes small compared to the starter resistance and the starter discharge for a non-discharging electrode set remains on after the main discharge for the other electrode set begins. In other words, the diode provides sufficiently high resistance initially to avoid the problem of low resistance described above and sufficiently low resistance thereafter to avoid the problem of too much resistance.

In starting the two-section laser described above, a low voltage from the power supply is initially applied to the laser electrodes and starter elements and the voltage is gradually raised. When the gas breakdown voltage of the starter-to-anode gaps is reached, an electrical discharge occurs between the pointed ends of the starter elements and the central pads of the anodes as indicated in broken lines in the drawings. The breakdown voltage for both starter elements may differ slightly due to different impedances in the respective gaps and therefore one starter discharge may begin before the other. This does not affect the operation of the other starter element, however, because the starter elements are electrically isolated from each other as explained above. With the discharge current flowing between both starter elements and the respective anodes, further increase in the voltage causes the main electrical discharges to occur between both sets of electrodes so that the laser is in operation.

While the invention has been described in conjunction with two sets of laser electrodes, it will be understood that the invention may also be practiced with one set of electrodes or three or more as required. In event the starter electrode is used with a single set of laser electrodes, there whould be no requirement for a diode.

What is claimed is:

1. In a gas transport laser having an enclosure and a gas lasing medium moving within and relative to said enclosure, at least one set of elongated spaced coextensive electrodes within said enclosure and extending transversely of the direction of gas flow, said electrodes comprising a tubular cathode having a downstream edge and a segmented anode, a DC power supply having negative and positive terminals connected to said cathode and anode, respectively, the improvement of means for initiating an electrical discharge between said cathode and anode comprising a wire-like starter element supported to extend closer to said cathode than to said anode and transversely of said cathode between the ends thereof and in the direction of gas flow, said element having one end near said cathode and being electrically connected to said negative terminal of said power supply whereby an increase in power supply output voltage produces an electrical discharge between said end of the element and said anode thereby inducing a subsequent electrical discharge between said cathode and said anode.

2. The laser according to claim 1 with two sets of said electrodes connected in parallel to said power supply terminals and in which one of said starter elements is associated with the cathode of each of said sets, each of said starter elements being connected to said negative terminal of the power supply by a diode and a resistor connected in series.

3. The laser according to claim 2 in which said end of each of said elements is pointed.

4. The laser according to claim 1 with only one starter element which extends between said cathode and said anode approximately midway between the ends thereof.

5. The laser according to claim 1 in which said end of the element is positioned farther downstream than the downstream edge of said cathode.

6. In a gas transport laser having an enclosure and a gas lasing medium circulating in said enclosure, a plurality of sets of electrodes in said enclosure, each set comprising an elongated cathode and a coextensive anode spaced therefrom, DC power supply means having a positive terminal means connected in parallel to said anodes and having a negative terminal means connected in parallel to cathodes, the improvement of means for initiating an electrical discharge between said cathodes and anodes comprising, a conductor extending under the middle of each cathode in the direction of gas flow and having an end with a relatively small cross-sectional dimension spaced closely to the cathode whereby the spacing between said conductor end and said anode is slightly less than the spacing of said cathode and said anode, said conductors being connected in parallel to the negative terminal means of said power supply means.

7. The laser according to claim 6 in which each conductor is connected to said negative terminal means through a resistor and a diode connected in series.

8. The laser according to claim 7 in which said end of each conductor is located farther than the downstream edge of the associated cathode.

9. The laser according to claim 8 in which said conductor end is spaced no greater than 1 cm. beyond the downstream edge of said cathode.

* * * * *